Jan. 14, 1964 L. C. MINUTILLA 3,117,612
CENTRIFUGALLY RETAINED TRACTION DEVICE
Filed March 8, 1962
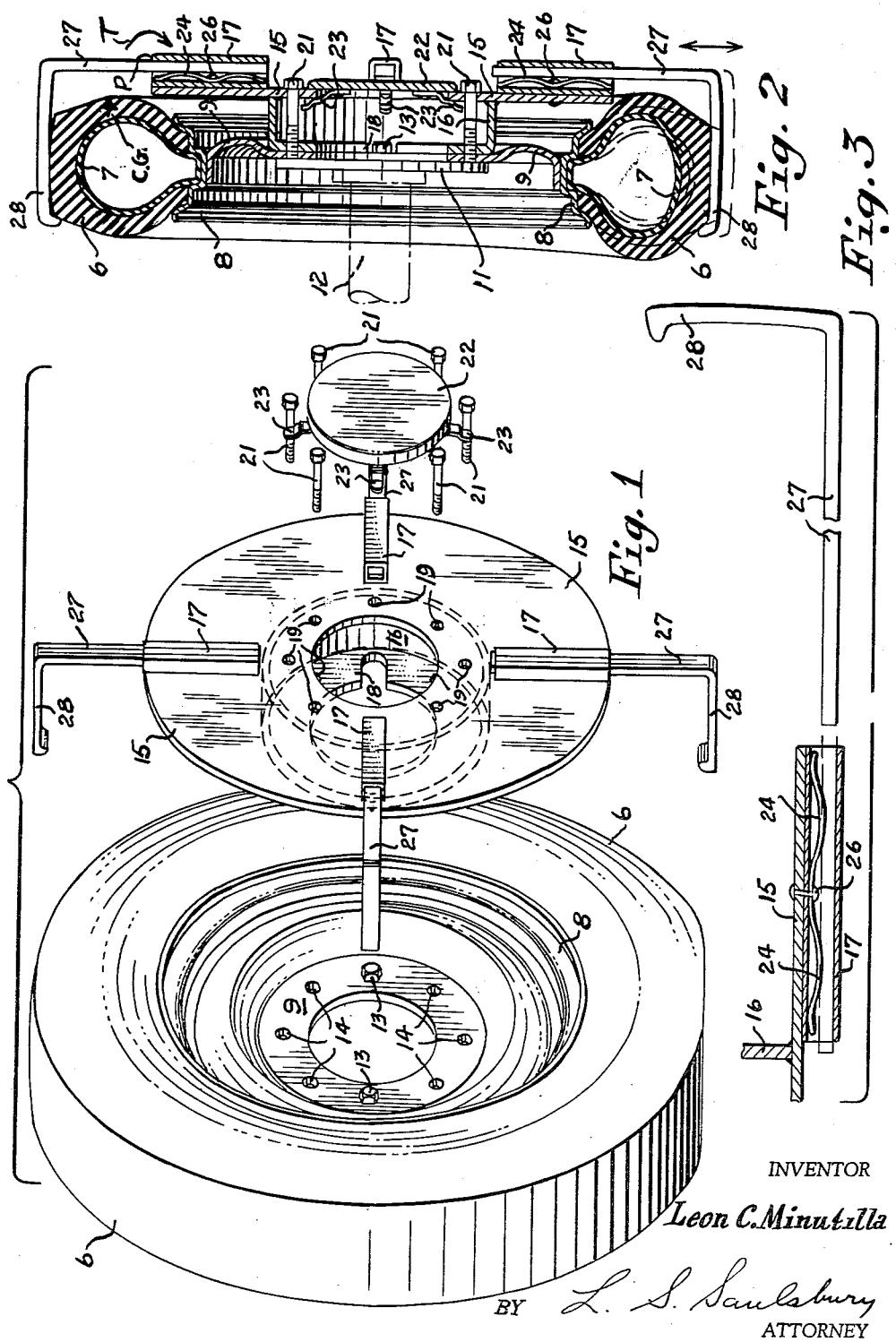
INVENTOR
Leon C. Minutilla
BY L. S. Saulsbury
ATTORNEY United States Patent Office 3,117,612
Patented Jan. 14, 1964

3,117,612
CENTRIFUGALLY RETAINED TRACTION DEVICE
Leon C. Minutilla, New York, N.Y., assignor to Rhode Island Spring Products, Inc., East Providence, R.I., a corporation of Rhode Island
Filed Mar. 8, 1962, Ser. No. 178,425
1 Claim. (Cl. 152—216)

This invention relates to an auxiliary traction aid for pneumatic automobile tires for use in snow or mud, and characterized by a novel principle of retention on the wheel which greatly facilitates the installation or removal of this traction aid.

It is well known in the art to attach traction aids to automobile tires. In general, this attachment has been made by retaining bolts, springs, or clamps requiring the use of tools, and involving an appreciable installation or removal time and effort.

The present invention provides a structure and geometry which makes possible the instant radial insertion or withdrawal of its traction cleats without tools, while positively locking and radially retaining them at high rotational speeds by using centrifugal force which would otherwise tend to throw off these cleats, to set up a torque about a tangential axis in such a way as to frictionally lock the cleats in their guide channels.

Further, this invention provides automatic radial self-adjustment to the degree of tire inflation or dilation under impact.

It is the principal object of the present invention to provide a wheel attachment for automobiles into which and from which traction aiding cleats may be inserted and removed with negligible effort while the automobile is at rest, and yet which cleats will automatically adjust themselves under wheel rotation to firmly grip the tire and the road while being retained against centrifugal ejection by a locking action responsive to these centrifugal ejection forces.

It is another object of the present invention to provide a device accomplishing the above object which is sturdy, simple, and inexpensive to manufacture.

It is still another object of the present invention to provide a wheel attachment for automobiles in which the conversion from its traction-aid mode of operation to its unaided mode of operation can be accomplished simply and rapidly by hand without the use of tools.

It is a further object of the invention to provide a wintertime traction device which may be attached without modification to existing standard automobile wheels, and which in its disabled highway cruising condition is silent and without relatively moving parts.

For other objects and for a better understanding of the present invention, reference may be had to the following detailed description taken in connection with the accompanying drawing, in which FIGURE 1 is an exploded perspective view of the preferred form of the invention, FIG. 2 is a vertical view in section taken through the axis of the automobile wheel and subject attachment shown in FIG. 1, and FIG. 3 is an enlarged fragmentary view showing the detailed construction of a removable traction aid cleat and its channel socket, parts being shown broken away.

Referring now to the drawings, 6 is a conventional automobile tire having an inner tube 7, a wheel rim 8, and a wheel disk 9 secured to rim 8. Disk 9 is normally secured to a wheel hub 11 and integral axle 12 by means of bolts 13 passing through clearance holes 14 in disk 9 and threaded into hub 11.

The traction attachment chassis of the subject invention consists of a disk member 15 to which are secured a spacing cup 16 and the four radial rectangular tubular cleat guide sleeves or sockets 17. The cup 16 is provided with the clearance cut out slots 18 to accommodate the residual normal wheel bolts 13. Also, cup 16 and disk 15 are provided with aligned holes 19 congruent with wheel holes 14. Thus, in the assembly of the subject attachment to the wheel disk 9 shown in FIG. 1, all but the two remaining bolts 13 shown in FIG. 1 are removed from wheel disk 9, and the guide socket assembly 15, 16, 17 is secured to the hub 11 and wheel disk 9 by means of a set of longer bolts 21.

A hub cap 22 having spring clips 23 is provided as a closure to the traction attachment disc 15.

The four guide sleeves or sockets 17 are each internally provided with a frictional double leaf spring 24 secured thereto by a rivet 26. These guide sleeves 17 are each designed to receive an L-shaped traction cleat 27 which is frictionally retained therein by the double leaf spring 24. The design of leaf spring 24 is such that cleat 27 may easily be manually inserted into the guide sleeve 17 and withdrawn therefrom when the wheel disk 9 is stationary, but that there is sufficient static friction to to prevent the cleat 27 from falling out by gravity alone.

A laterally-extending arm 28 of cleat 27 is adapted to embrace the periphery of the tire 6 and to form a traction aid which will engage the snow or mud to diminish the slippage of tire 6 relative thereto.

The operation of this invention is as follows: With the socket assembly 17, 15, 16, 22 installed on wheel disk 9 as described, by bolts 13 and 21, the cleats 27 are inserted in their respective guide sleeves 17. This may necessitate the moving of the automobile by a fraction of a tire periphery if a socket 17 is too near a vertical position.

After the foregoing cleat insertion, any rotation of wheel disk 9 will set up centrifugal forces tending radially to cast off any mass rotating with wheel disk 9. However, the center of gravity, marked C.G., FIG. 2, of any cleat 27 will lie intermediate between the axis of guide sleeve or channel 17 and the central plane of the tire 6. Consequently, there will be a torque T, FIG. 2, due to the centrifugal force set up about a fulcrum point P which will tend to drive the inner end of cleat 27 inward to further compress the lower inner half of spring leaf 24 and to lock cleat 27 from radial motion by increased friction. In this manner, the very centrifugal force which would tend to cast off the cleats, has been utilized to hold the cleats in locking retention.

It is to be especially noted that this design provides automatic adjustment with each revolution of wheel disk 9 as to the radial positioning of cleats 27 into close contact with tire 6 even though the initial insertion of cleat 27 into its socket 17 had not been complete. This is because as each outer arm 28 of cleat 27 passes between the tire 6 and the ground, FIG. 2, the frictional locking between guide sleeve 17 and cleat 27 is overcome and the cleat arm 28 is repositioned into close contact with tire 6 where it is held by the foregoing locking torque T during the remainder of the wheel revolution.

While various changes may be made in the detailed construction, it shall be understood that such changes shall be within the spirit and scope of the present invention as defined by the appended claim.

What is claimed is:

A traction device for wheeled vehicles having wheels and tires, said device comprising disk means secured to one of said wheels, at least one tubular guide socket secured to said disk means and having an axis substantially radial with respect to the axis of said one wheel, an L-shaped traction cleat removably insertable radially in said socket, and spring friction means in said guide socket maintaining static friction between said socket and said cleat, forming the sole connection between said cleat and said socket, the center of gravity of said cleat lying intermediate between the central plane of said tire and the axis of said guide socket whereby centrifugal force acting on said cleat during wheel rotation augments the frictional retaining forces between said socket and said cleat, said spring means comprising a leaf spring lying within and secured to one side of said guide socket.

References Cited in the file of this patent

UNITED STATES PATENTS

| | | |
|---|---|---|
| 2,169,950 | Hamalainen | Aug. 15, 1939 |
| 2,212,076 | Rollings | Aug. 20, 1940 |

FOREIGN PATENTS

| | | |
|---|---|---|
| 763,034 | France | Feb. 5, 1934 |
| 813,291 | France | Feb. 22, 1937 |